United States Patent [19]
Volat

[11] Patent Number: 5,138,798
[45] Date of Patent: Aug. 18, 1992

[54] METHOD AND APPARATUS FOR POLISHING AN OPTICAL COMPONENT

[75] Inventor: Jean-Pierre Volat, Aix en Provence, France

[73] Assignee: Bertin & Cie, Plaisir, France

[21] Appl. No.: 458,732

[22] PCT Filed: Apr. 5, 1989

[86] PCT No.: PCT/US89/00154
§ 371 Date: Dec. 4, 1989
§ 102(e) Date: Dec. 4, 1989

[87] PCT Pub. No.: WO89/09680
PCT Pub. Date: Oct. 19, 1989

[30] Foreign Application Priority Data
Apr. 6, 1988 [FR] France .................. 88 04519

[51] Int. Cl.$^5$ ............................................. B24B 13/06
[52] U.S. Cl. ..................... 51/124 L; 51/165.77; 51/284 R
[58] Field of Search ............... 51/119, 120, 124 L, 51/124 R, 125, 125.5, 126, 165.77, 283 R, 284 R

[56] References Cited
U.S. PATENT DOCUMENTS

| | | |
|---|---|---|
| 3,769,762 | 11/1973 | Mayo . |
| 4,592,684 | 6/1986 | Baker .................. 51/284 R |
| 4,598,502 | 7/1986 | Lombard ............... 51/124 L |
| 4,768,308 | 9/1988 | Alkinson ............... 51/124 L |
| 4,956,944 | 9/1990 | Ando .................... 51/124 L |

FOREIGN PATENT DOCUMENTS

| | | |
|---|---|---|
| 1938004 | 1/1970 | Fed. Rep. of Germany . |
| 2365409 | 4/1978 | France . |
| 2448417 | 9/1980 | France . |
| 163052 | 10/1987 | Japan ................. 51/284 R |
| 8909680 | 10/1989 | PCT Int'l Appl. ...... 51/284 R |

OTHER PUBLICATIONS

*NTIS Technical Notes*, No. 12, Part F, Dec. 1985, (Springfield, Va.), *Programmed Optical Surfacing Equipment*, p. 1375.
*Applied Optics*, vol. 21, No. 3, Feb. 1, 1982, Optical Society of American, (New York), R. A. Jones: *Segmented Mirror Polishing Experiment*, pp. 561–564.
*Optical Engineering*, vol. 22, No. 2, Mar./Apr. 1983, Society of Photo-Optical Instrumention Engineers, (Bellingham, Wash.), R. A. Jones: *Computer-Controlled Polishing of Telescope Mirror Segments*, pp. 236–240.
*Applied Optics*, vol 26, No. 12, Jun. 15, 1987, Optical Society of America, (New York, NY), G. Doughty et al.: *Microcomputer-Controlled Polishing Machine for Very Smooth and Deep Aspherical Surfaces*, pp. 2421–2426.

*Primary Examiner*—Bruce M. Kisliuk
*Assistant Examiner*—John A. Marlott
*Attorney, Agent, or Firm*—Bell, Seltzer, Park & Gibson

[57] ABSTRACT

Method and apparatus for polishing the surface of an optical component by means of a polisher (12) carried by a support (24) which is pivotally mounted at the end of a robot arm (10) and which includes means for uniformly distributing the action of the polisher over the surface of the optical component (14) together with means for adjusting said action. The invention makes it possible to accelerate and automate the polishing of optical components.

20 Claims, 4 Drawing Sheets

METHOD AND APPARATUS FOR POLISHING AN OPTICAL COMPONENT

The invention relates to a method and to apparatus for polishing an optical component.

The conventional technique for fabricating optical components such as lenses or mirrors comprises successive operations of providing a blank, grinding it down, and then polishing it. The blank is made by machining using a bell-shaped tool with abrasive diamonds. Grinding down and polishing are both performed by means of a polisher and an abrasive. Grinding down is a roughing-down operation which is relatively quick and easy to perform, but polishing is a very long and expensive operation on which the optical quality of the component depends entirely.

At present, polishing is characterized both by the age and primitiveness of the machines used and by the subtlety of the skilled know-how of the personnel performing this operation. Traditional polishing machines essentially comprise a lathe having a vertical axis of rotation on which the component to be polished is fixed, a polisher coming into contact with the surface of the component to be polished, said polisher being supported in its center by a ball-and-socket connection and being driven through orbital motion while bearing against the surface to be polished, and mechanical linkage means for positioning the polisher and for generating its motion.

The polishing method consists in interposing an abrasive powder of determined grain size and a wetting liquid between the polisher and the component to be polished. Abrasive feed, the type of polisher, its diameter, the bearing pressure applied thereto, the position, amplitude, and speed adjustments of its orbital motion, and the adjustment applied to the rotation of the lathe all constitute polishing parameters. It is necessary to proceed with considerable caution given that the localization and amplitude of polishing operations are not exactly controlled. Thus, polishing is performed by alternating operations of verification and of removing a very small amount of material. If too much material is removed from any given point, and the measurement to which successive polishing operations were converging is exceeded, then the entire surface of the optical component needs to be started over. This is a permanent danger, and each time it happens cost is considerably increased.

In order to avoid these drawbacks, specialized personnel undertake a very large number of verification operations and between these operations polishing operations are performed during which only a small portion of the surface defects (in excess) in need of correction are, in fact, removed.

As a result, if a 600 mm diameter mirror is being polished to an accuracy of $\frac{1}{8}$ of a wavelength, for example, then about 400 hours of machine time and 150 hours of specialized personnel time are required. During the finishing period alone (which lasts for 10 to 15 days), two to three verifications of the surface state of the component are required each day. About 40 successive polishing operations are required in order to reduce the amplitude of surface defects from 5 microns to $\frac{1}{8}$ of a wavelength.

This multiplication of individual polishing operations is due to them being voluntarily limited to an effectiveness of about 10% during each individual operation, such that about 90% of the amplitude of the defect remains to be treated. Clearly, if this effectiveness could be improved without risk, then the number of operations required for polishing optical components could be considerably reduced, thereby reducing their cost.

In addition, if polishing conditions could be mastered, then these operations could be automated.

A particular object of the invention is to provide a method and apparatus for polishing optical components and satisfying these requirements.

The invention thus provides a method of polishing an optical component by means of a polisher mounted on a motion-generating and guiding support, the method being characterized in that it consists in transferring parameters defining individual polishing operations to the polisher and its support, and in quantifying the parameters, in making the polisher and its support insensitive to disturbing reactions that appear at the polisher-component surface interface, in giving said parameters values or successive groups of values which correspond respectively to one or several areas of the component to be polished and which are obtained by comparing the desired final surface of the component with an accurate survey of its surface defects, in executing the, or each, individual polishing operation defined by said parameter values, then in performing a subsequent accurate survey of the surface defects of the component for deducing new values for the polishing parameters.

According to the invention, the poorly defined interaction between the polisher and the surface of the optical component as encountered in the prior art is replaced by a precise and well-controlled action of the polisher on the surface of the optical component by virtue of the polishing parameters being transferred to the tool, and by virtue of the tool being insensitive to the reactions of its interface with the optical component.

The method of the invention is also characterized in that it consists in giving the parameters values that enable at least 50% of the amplitude of the defects to be removed from the surface being treated in a predetermined polishing area during an individual polishing operation.

In practice, the effectiveness of the individual polishing operations may reach a value of 70% to 80%, thereby making it possible, after three or four individual polishing operations, to obtain the same results and the same accuracy in surface state as could be obtained only after 40 polishing operations in the prior art. The invention therefore makes it possible to divide the number of finishing operations, and thus also the number of verification operations, by a factor of about 10.

According to another characteristic of the invention, the method also consists in uniformly distributing the action of the polisher over the surface of the optical component in their area of contact and in retaining this uniform distribution during the motion and displacements of the polisher over said surface.

Advantageously, the invention provides for creating a virtual center of rotation for the polisher relative to its support at a point which substantially coincides with the point of application of the resultant of the friction forces between the polisher and the surface of the component in their area of contact.

In this way, the motion and displacement of the polisher over the surface of the component cannot spoil the uniformness of the effect of the polisher on the optical component.

According to another characteristic of the invention, the method also consists in polishing the surface of the component area-by-area, while modifying the values of at least some of the polishing parameters on going from one area to another, said areas being, for example, spherical caps about various different axes, spherical zones, or any other spherical surface fractions.

Since the polishing parameters are mastered, their values can be varied from one portion to another of the surface to be polished, thereby obtaining the desired result more quickly.

When the optical component has an axis of revolution, the method also consists in servo-controlling the rotation of the component so as to position it or to drive it in continuous, discontinuous, or variable speed rotation about said axis, in slowing down, in reversing, or in stopping the rotation of the component in order to polish an area of its surface, or in restarting said rotation in order to displace the polisher from a first area to another.

In a variant, or for some of the individual polishing operations, it is naturally possible to drive the component in continuous rotation about its axis of revolution in order to polish a zone as a segment of a sphere.

The invention also provides a device for polishing an optical component, the device comprising a polisher and a support for guiding and generating motion of the polisher over the surface of the component, the apparatus being characterized in that it comprises means for mounting the polisher on its support to rotate about a point which substantially coincides with the point of application of the resultant of the friction forces between the polisher and the surface of the component in their area of contact.

According to another characteristic of the invention, the device comprises pneumatic means for controlling and adjusting the force with which the polisher is pressed against the surface of the component.

Advantageously, the pneumatic control and adjustment means constitute pneumatic suspension means for suspending the polisher from its support, and also serving to absorb vibration of said support.

In a preferred embodiment of the invention, the device comprises means for rotating the polisher about its axis, means for displacing the polisher in circular translation about the axis of its support, and means for providing relative displacement of the optical component relative to the polisher.

According to another characteristic of the invention, the polisher support forms the last hinged element of a robot arm having three degrees of freedom and servo-controlled in position.

More precisely, the support comprises a turntable to which the polisher is fixed by two pairs of bending blades disposed in cascade and at 90° to each other, the virtual intersection lines of these pairs of blades defining two axes about which the polisher rotates, which axes are perpendicular and intersect at a point forming the virtual center of rotation of the polisher.

The turntable is mounted on a shaft coaxial with the polisher so as to be free to slide and to rotate, and is connected to drive means by the means for pneumatically suspending the polisher and for adjusting the force with which it is pressed against the component.

In addition, the turntable is supported by a frame guided in circular translation in such a manner as to remain parallel to itself and about an axis which is parallel to the axis of the polisher, by means of a crank and connecting rod system of adjustable excentricity.

The invention will be better understood and other details, characteristics, and advantages thereof will appear on reading the following explanatory description made by way of example and with reference to the accompanying drawings, in which.

Figure 1:
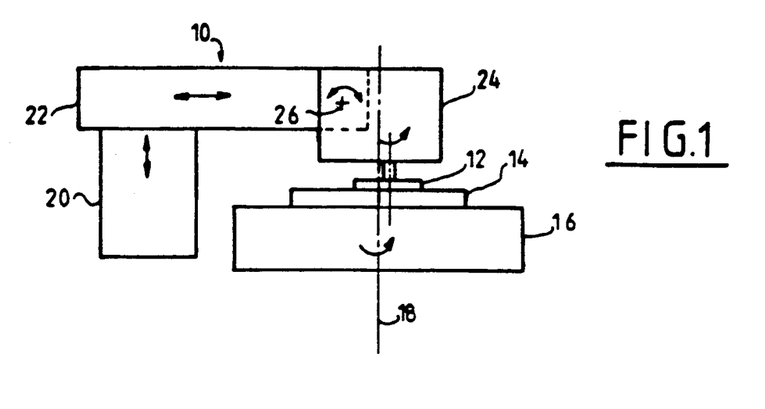
FIG. 1 is a diagram of a polishing device in accordance with the invention.

The polishing device of the invention shown diagrammatically in FIG. 1 essentially comprises a robot arm 10 having three degrees of freedom and servo-controlled in position, the arm carrying a polisher 12 which is moved over the surface to be polished of an optical component 14 mounted on the turntable of a lathe 16 having a vertical axis of rotation 18.

More precisely, the robot arm 10 comprises a vertical element 20 provided with means for vertically displacing a horizontal element 22 which is itself displaceable horizontally in translation, and a third element 24 for supporting the polisher 12 is mounted at the end thereof to tilt about a transverse horizontal axis 26.

The structure of a particular embodiment of this third element of the robot arm 10 is shown in greater detail in FIGS. 2 to 6.

Figure 2:
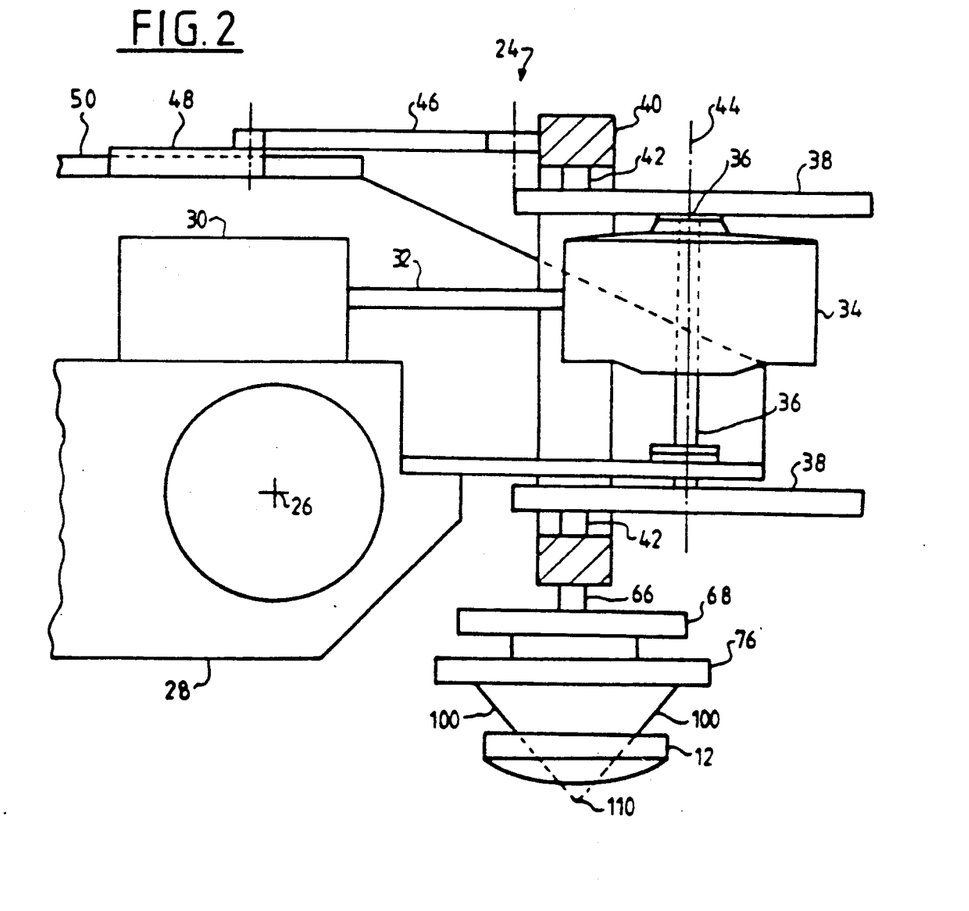
FIG. 2 is a diagram on a larger scale of the polisher support.

This third element 24 comprises (see FIG. 2) a chassis 28 mounted to rotate about the axis 26 on the second element 22 of the robot arm, and carrying an electric motor 30 whose drive shaft 32 is connected to a stepdown gear unit 34 having a hollow drive shaft 36 which is vertical in FIG. 2. This drive shaft 36 rotates together with two parallel crank arms 38 which are horizontal in FIG. 2 and which carry a frame 40 which is square or rectangular in outline and which is disposed in a plane which is vertical in FIG. 2. The frame 40 is pivotally mounted on the arms 38 about a central vertical axis by means of two suitable hinges 42 disposed in the middles of the horizontal sides of the frame 40.

The stepdown gear unit 34 which supports the arms 38 and the frame 40 is itself supported by the chassis 28.

The frame 40 is preferably guided in circular translation motion about the axis 44 of the drive shaft 36 of the stepdown gear unit 34. This is done (see FIGS. 2 and 4) by the top portion of the frame 40 being connected by two same-length parallel articulated links 46 to a carriage 48 slidably mounted on a horizontal rail 50 carried by the chassis 28. As a result, rotation of the arms 38 about the axis 44 of the drive shaft of the stepdown gear unit 34 is transformed into circular translation motion of the frame 40 (which continues to stay parallel with itself) centered on the axis 44.

Advantageously, the excentricity of this circular motion, i.e. the distance between the axis 44 and the axes of the hinges 42 of the frame 40 on the arms 38 is adjustable, e.g. as follows: each arm 38 contains a rack 52 (FIG. 3) which meshes with a toothed wheel 54 connected by a shaft 56 to the corresponding toothed wheel 54 of the other arm 38. The shaft 56 is coaxial with the shaft 36 of the gear unit 34, said arm 36 being tubular so as to enable the shaft 56 interconnecting the two toothed wheels 54 to be received therein. Each rack 52 is constrained to move in translation with a vertical shaft 58, each of which has a threaded end which is screwed into a tapped hole of the rack 52, an intermediate threaded portion receiving a locknut 60 on the corresponding arm 38, and an opposite end portion connected to the corresponding side of the frame 40 via a ball or roller abutment 62 in order to constitute said hinge 42. One of the racks 52 has a tapped hole parallel to the direction of the corresponding arm 38 with an adjustment screw 64 received therein and accessible from one end of the arm 38. Rotating the screw 64 in one direction or the other displaces the corresponding rack 52 in one direction or the other relative to the arm 38. This displacement of the rack 52 rotates the toothed wheel 54 and the rotation is transmitted via the shaft 56 to the toothed wheel 54 associated with the rack 52 on the other arm 38. As a result the racks 52 are displaced synchronously on the arms 38, thereby adjusting the distance between the axis 44 and the hinges 42 in a single operation. In practice, this distance may be adjustable over a range 0 mm to 100 mm, for example.

Figure 4:
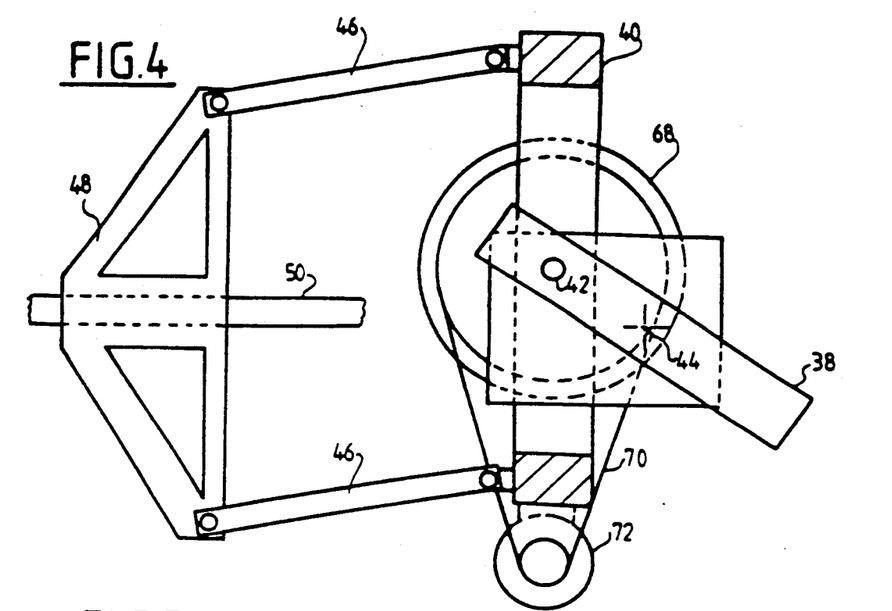
FIG. 4 is a diagrammatic plan view of the FIG. 2 polisher support.

The bottom horizontal side of the frame 40 is connected by a length of shaft 66 to a pulley 68 which is connected by a cog belt 70 to the drive shaft of a motor and stepdown unit 72 carried by one of the vertical sides of the frame 40 (FIG. 4).

The pulley 68 which is supported by the length of shaft 66 and which is mounted free to rotate thereon by means of bearings 74 (FIG. 3) is constrained to rotate (by means of torque blades not shown) with a turntable 76 which is guided in rotation and in translation by means of a ball sleeve 78 on the bottom end of the length of shaft 66.

Figure 3:
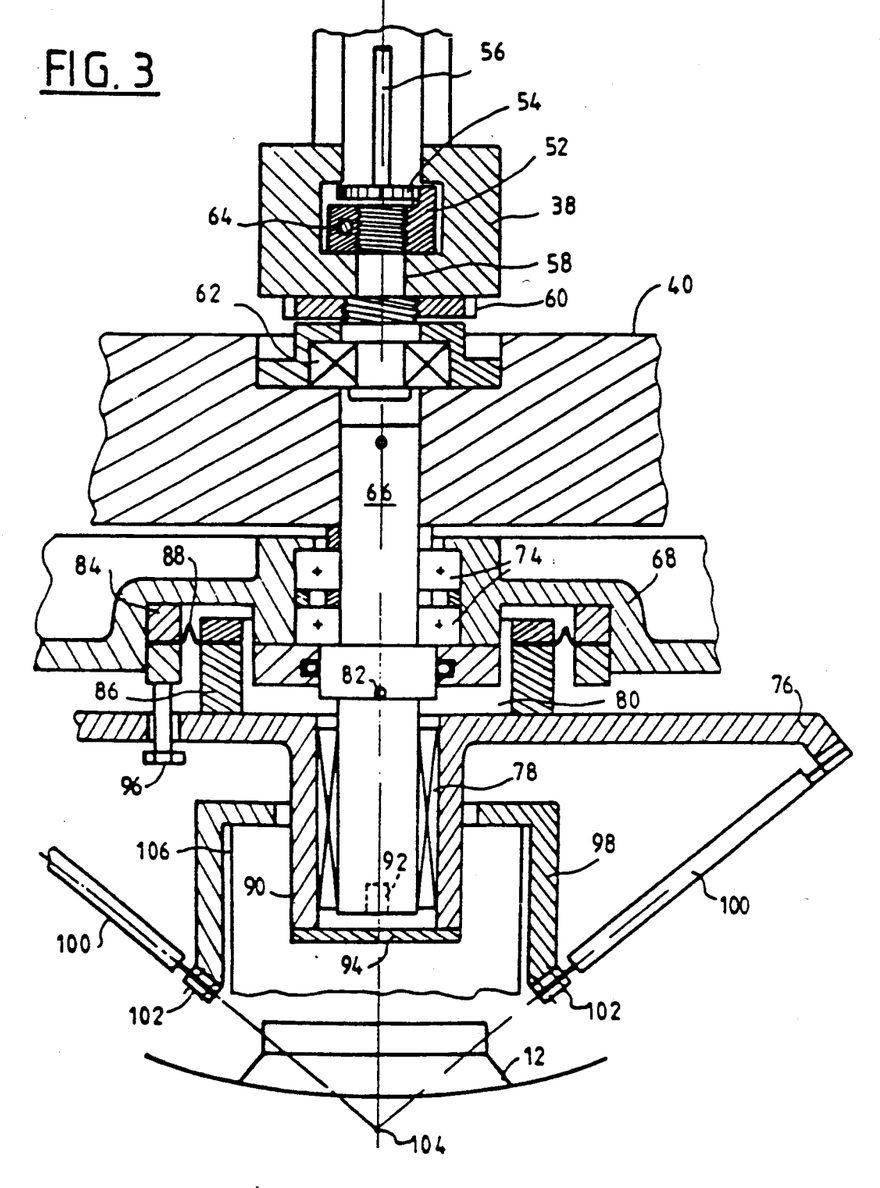
FIG. 3 is a diagrammatic section on a larger scale through the bottom portion of the support.

The turntable 76 is also connected to the pulley 68 by pneumatic suspensions of substantially constant stiffness. To this end, the pulley 68 and the turntable 76 delimits an intermediate fluid chamber 80 connected to a source of gas under pressure by means of a channel or passage 82 going through the shaft 66.

More precisely, the pulley 68 and the turntable 76 include two respective coaxial cylindrical rims 84 and 86 which are connected to each other by an elastically deformable annular membrane 88, thereby sealing the chamber 80. The bottom end of the shaft 66 received in a well 90 on the turntable 76 is provided with a proximity detector 92 for detecting the position of the bottom 94 of the well 90 and corresponding to the turntable 76 coming into abutment with the end of the shaft 66. This detector enables height adjustment to be performed for midstroke operation. The displacement of the turntable 76 in the other vertical direction is limited by an abutment 96 carried by the pulley 68.

Figure 5:
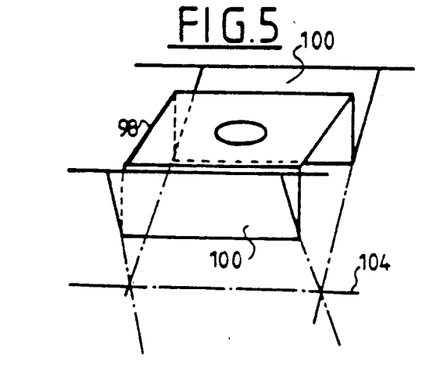
FIGS. 5 and 6 are diagrams showing the means for mounting the polisher on the support.
Figure 6:
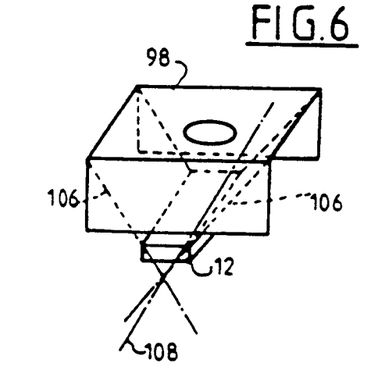

The turntable 76 supports the polisher 12 by means which are described below with reference to FIGS. 3, 5, and 6.

These means comprise a channel section horizontal beam 98 with its channel facing downwards, two pairs of bending blades 100, 106 which are mounted in cascade, one pair of blades 100 connecting the turntable 76 to the beam, and the other pair of blades 106 connecting the beam to the polisher. In order to clarify the drawing, one pair of blades 100 is shown in FIG. 5 and the other pair of blades 106 is shown in FIG. 6. The two bending blades 100 are opposite each other and are symmetrically disposed about the axis of the shaft 66, and each of them has its ends fixed on the turntable 76 and on the bottom end 102 of a vertical wall of the beam 98. The two blades 100 slope in such a manner that if projected they would intersect along a line 104 which is perpendicular to the axis of the shaft 66 and which is situated beneath the beam 98. This line 104 constitutes a first axis of rotation of the beam 98.

The other two bending blades 106 are of the same type as those described above and each of them is fixed at one end to a longitudinal end of the horizontal wall of the beam 98 and they extend symmetrically and obliquely between the vertical walls of the beam so that their opposite ends are fixed to the polisher 12. If extended, these bending blades 106 would intersect along a line 108 which is perpendicular to the axis of the shaft 66 and to the axis 104 of rotation of the beam 98. This line 108 constitutes a second axis of rotation of the polisher 12 relative to the beam 98. In addition, the heights and the slopes of the beam 98 and of the bending blades 100 and 106 are designed in such a manner as to ensure that the axes of rotation 104 and 108 are coplanar. They intersect at a point which constitutes the virtual center of rotation of the polisher 12 relative to the turntable 76, in a manner equivalent to that of a universal joint. This center of rotation is referenced 110 in FIG. 2 and coincides with the point of application of the resultant of the friction forces of the polisher 12 on the surface to be polished of the optical component 14, as explained below with reference to FIG. 7.

Figure 7:
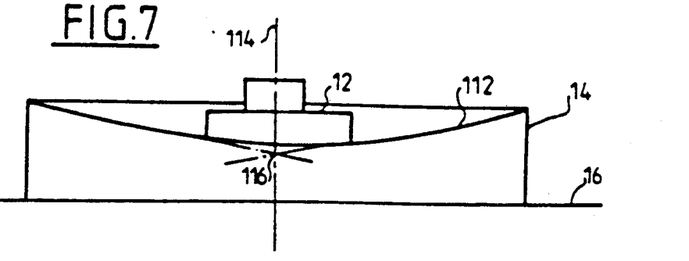
FIG. 7 is a diagram showing the action of the polisher on the surface of an optical component.

In this figure, the polisher 12 is shown diagrammatically pressed against the concave surface 112 to be polished of the optical component 14. The polisher 12 is constituted conventionally, i.e. it comprises a bottom surface constituted by a plate which is machined to have the same curvature as the curvature which is locally desired for the surface 112. This bottom plate is provided with a coating of a material enabling it to retain abrasive and having a degree of plasticity in order to adapt to the surface to be polished.

When such a polisher is displaced over the surface to be polished of an optical component, the friction forces between the polisher and the surface 112 are always tangential to the surface 112 and are oriented in the opposite direction to the direction of displacement of the polisher 12 over the surface 112. The point 116 of application of their resultant lies on the vertical axis 114 of the polisher beneath the surface 112, i.e. on the convex side of the interface, inside the optical component. As mentioned above, the vertical center of rotation 110 of the polisher on its support coincides with this point 116. As a result, when the polisher 12 is displaced over the surface 112 to be polished, this displacement sets up no tilting moment in the polisher and therefore does not modify in any way the distribution of normal and tangential forces between the polisher 12 and the surface to be polished, and this is in contrast to the situation which obtains if the polisher 12 is mounted on its support by means of a real mechanical ball-and-socket joint whose center would necessarily be situated on the concave side of the interface and would therefore necessarily be at a distance from the point 116, thereby giving rise to a tilting couple on the polisher 12 between the displacement force applied to the center of the ball-and-socket joint and the resultant of the friction forces applied at the point 116, and thus to an uncontrolled modification of the action of the polisher on the surface it is to polish.

When the surface to be polished of the optical component is convex, the point of application of the resultant of the friction forces between the polisher and the surface to be polished lies above the surface to be polished, and the polisher is then designed so that its virtual center of rotation again coincides with said point.

In general, an optical component is polished in accordance with the invention as follows.

The pneumatic suspension means for the turntable 76 carrying the polisher 12 make it possible by means of a pneumatic regulator and a servo-control system to control the pressure of the gas in the chamber 80. A pressure reduction in this chamber lightens or raises the polisher in order to displace it from one zone to another of the surface to be polished. Conversely, a pressure in the chamber 80 greater than atmospheric pressure increases the force with which the polisher is pressed against the surface to be polished.

By mounting the polisher on the turntable 76 via a virtual center of rotation which coincides with the point of application of the resultant of the friction forces between the polisher and the surface to be polished, it is possible to displace the polisher over said surface while conserving uniform distribution of the action of the polisher over the surface of the optical component, with said action being due to the thrust force of the polisher and to its motion over the surface.

By suspending the turntable 76 pneumatically relative to the pulley 68, another advantage is obtained of not transmitting axial vibration of the pulley to the polisher. The three degrees of freedom of the elements of the robot arm (vertical translation, horizontal translation, and tilting about the axis 26) make it possible to determine the zone of the surface of the optical component which is to be subjected to a polishing operation. The speed of rotation of the frame 40 about the axis 44 of the stepdown gear unit 34, the degree of excentricity, the speed of rotation of the turntable 76 about the axis of the pulley 68, the pressure with which the polisher 12 is pressed against the surface of the optical component, the type of abrasive used, the rotation of the optical component 14 about its axis of revolution, and time, all constitute other parameters of a polishing operation. By mastering and quantifying these parameters and also by accurate knowledge of the location and the amplitude of defects in the surface to be corrected, it is possible to perform individual polishing operations having an effectiveness of 70% to 80% without danger of going past the desired measurement. As a result, in comparison with the prior art, the number of individual polishing operations required to obtain a surface state having determined accuracy, e.g. about ¼ of the wavelength of light, is divided by a factor of about 10. Surface defects are located and their amplitudes are measured by means of equipment which is available on the market, e.g. as sold under the trademark ZYGO, and suitable for coupling to a microcomputer. As a result polishing operations can be programmably automated on the following lines:

accurate survey of surface defects on the component;
transmission of said survey to the microcomputer;
optional display of said surface defects for viewing by an operator;
selection of the tool and the abrasive appropriate to removing the measured excess defects;
programming the displacements of the tool for correcting the major part of said defects, provisionally determining the expected results, and finalizing the program;
performing the polishing; and
performing a new survey of the surface defects of the component.

Unlike the prior art, the invention makes it possible to polish the surface of an optical component area-by-area without it being necessary for the areas to be spherical zones. The lathe 16 driving the optical component about its axis of revolution can be used to move from one area to another.

Continuous rotation of the lathe may make it possible to limit the work of the polishing tool to spherical zones or spherical caps.

Correspondingly, the invention is also applicable to polishing surfaces which are not surfaces of revolution.

Finally, it will be observed that all of the movements of the polisher and of the robot arm, and also the rotation of the optical component about its axis of revolution are servo-controlled in position in order to avoid harmonic coupling between these various motions so as to guarantee that no point of the polisher passes cyclically over the same points of the surface to be polished.

By way of example, the characteristics of a polishing device in accordance with the invention may be as follows:

Vertical displacement of the first element of the robot arm: 200 mm.
Horizontal displacement of the second element of the robot arm: 1000 mm.
Angle of inclination about the axis 26 relative to the vertical: 0° to 30°.
Speed of displacement relative to these three axes: about 1/10 of the stroke per second.
Speed of rotation of the polisher about its axis: about 2 revolutions per minute.
Excentricity of circular translation motion of the frame 40: from 0 mm to about 100 mm.
Thrust force of the polisher against the surface of the component: from 0 to several tens of kg.

Such a device can be used, for example, to polish medium- and large-size components (diameters from 600 mm to about 2 m).

Figure 8:
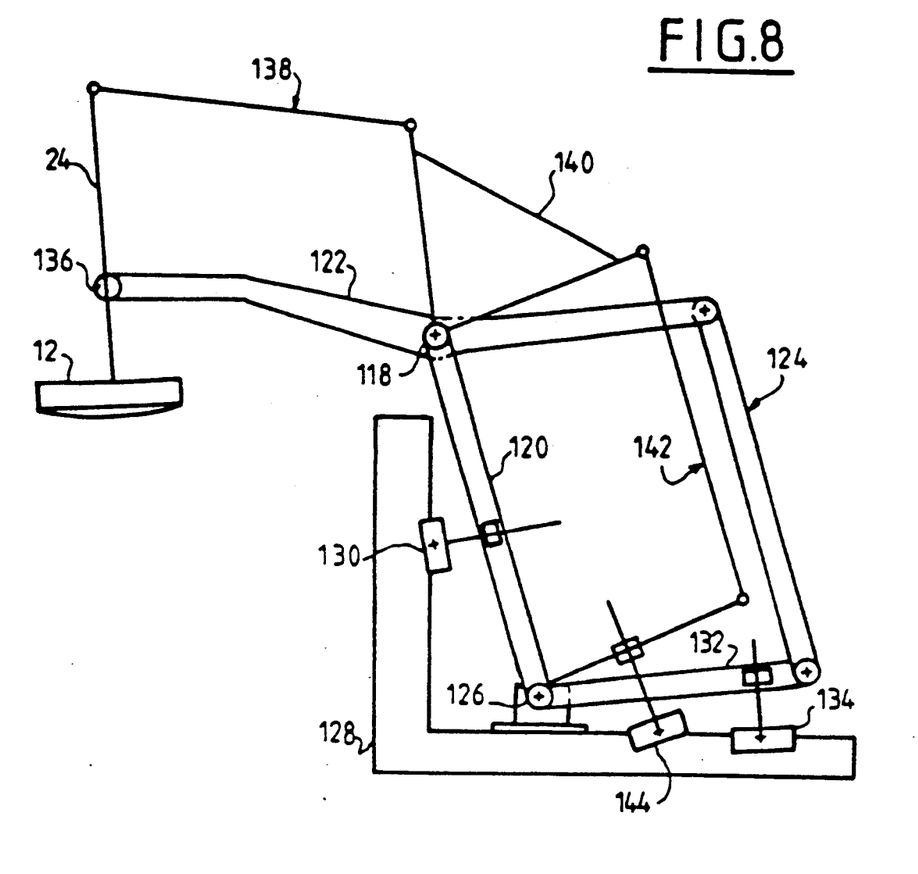
FIG. 8 is a diagram showing one embodiment of a robot arm.

The structure of the robot arm may be as shown in FIG. 8, for example. In this example, the three elements or the robot arm are pivotally mounted about horizontal axes and form portions of deformable parallelograms.

The first element 120 and the second element 122 of the robot arm are hinged to each other about an axis 118 and form parts of a single parallelogram 124 hinged at 126 to a fixed stand 128.

The first element 120 is driven about the axis 126 by a motor 130.

A third side 132 of the parallelogram, parallel to the element 122, is driven about the axis 126 by a motor 134 and rotates the element 122 about the axis 118. The third element of the robot arm, which constitutes the support 24 for the polisher 12, is hinged at 136 to the end of the second element 122 and constitutes a portion of a parallelogram 138 which is connected by means of an undeformable triangle 140 hinged at 118 and a parallelogram 142 hinged at 126 to a motor 144 mounted on the fixed stand at the base of the robot arm.

Combined rotations of the first element 120 about the axis 126 and of the second element 122 about the axis 118 enable the end of the second element to be placed at any desired point in the plane of the drawing relative to the surface of a component to be polished. Rotation of the support 24 about the axis 136 determines the orientation of the axis of the polisher relative to the surface to be polished.

I claim:

1. An apparatus for polishing an optical component, said apparatus comprising:
   a polisher having a polishing surface and an axis of rotation that is substantially normally to said polishing surface;
   a support for guiding and moving said polisher over the optical component, said support comprising means for rotating said polisher about its axis of rotation, means for moving said polisher over the optical component in translation, and a rotatable turntable;
   means for mounting said polisher on said turntable of said support so that said polisher may rotate about a point which substantially coincides with the point of application of the resultant of the friction forces between said polisher and the surface of the optical component, said means for mounting comprising first and second pairs of bending blades positioned between said turntable and said polisher, said first and second pairs of bending blades being disposed in cascade and at 90° to each other such that the virtual intersection lines of said first and second blades define two perpendicular axes which intersect to define said point about which said polisher may rotate.

2. Apparatus according to claim 1 further comprising a longitudinal shaft connected to said polisher and suspended from said support, said turntable being mounted on said shaft so as to be coaxial with the axis of rotation of said polisher and adapted for free sliding and rotation on said shaft;
   drive means for rotating said turntable and polisher; and
   pneumatic suspension means interconnecting said drive means and turntable for adjusting the force with which said polisher is pressed against the surface of the optical component.

3. Apparatus according to claim 2 wherein said shaft from which said turntable and polisher are supported is suspended from a movable frame, said frame being driven by a crank and connecting rod system of adjustable eccentricity for driving said movable frame and the longitudinal shaft, turntable and polisher thereon in circular translation such that said frame remains longitudinally oriented while in translation.

4. An apparatus for polishing an optical component, said apparatus comprising:
   a polisher having a polishing surface and an axis of rotation that is substantially normal to said polishing surface;
   a support for guiding and moving said polisher over the optical component, said support comprising means for rotating said polisher about its axis of rotation and means for moving said polisher over the optical component in translation;
   means for mounting said polisher on said support so that said polisher may rotate about a point which substantially coincides with the point of application of the resultant of the friction forces between said polisher and the surface of the optical component;
   a fixed stand; and
   a robot arm comprising first, second and third articulated elements, said first element being pivotally mounted on said fixed stand for rotation about a substantially horizontal axis, said second element being pivotally mounted to said first element for rotation about an axis that is substantially parallel to said axis of rotation of said first element, and said third element being pivotally mounted to said second element for rotation about a third axis parallel to said first and second axes, whereby said first, second and third articulated elements cooperate to support said polisher above an optical component for polishing.

5. Apparatus according to claim 4 wherein said first, second and third elements of said robot arm define sides of three separate deformable parallelogram mechanisms, said parallelogram mechanisms being interconnected and wherein two said parallelogram mechanisms are hinged about a common horizontal axis on said fixed stand.

6. A method of polishing an optical component comprising the steps of:
   supporting a polisher by a pneumatic suspension so that the polisher has a polishing surface positioned in close proximity to an optical component and so that the polisher may rotate about a point which substantially coincides with the point of application of the resultant of the friction forces between the polisher and the surface of the optical component;
   moving the polisher in translation over a surface of the optical component; and
   rotating the polisher about an axis of rotation that is substantially normal to the polishing surface of the polisher.

7. A method according to claim 6 further comprising the step of adjusting the force between the polisher and the optical component by controlling the pressure of a gas contained within the pneumatic suspension.

8. A method according to claim 6 further comprising the steps of:
   detecting and measuring surface defects at predetermined areas of the optical component; and
   polishing the areas of the optical component that have been detected and measured, said steps of detecting and measuring and of polishing being performed in an alternating fashion, and wherein at least fifty percent of the amplitude of the surface defects that are identified in each predetermined area by said detecting and measuring step is removed by said polishing step following said detecting and measuring step.

9. A method according to claim 8 further comprising the step of modifying the thrust force of the polisher on the optical component, the rotation speed of the polisher, the amplitude or speed of the translation of the polisher, or the duration of the polishing step as the polisher is moved between particular predetermined locations on the optical component to vary the amount of material removed from the optical component during said polishing step.

10. An apparatus for polishing an optical component, said apparatus comprising:
    a polisher having a polishing surface and an axis or rotation that is substantially normal to said polishing surface;
    a support for guiding and moving said polisher over the optical component, said support comprising means for rotating said polisher about its axis of rotation and means for moving said polisher over the optical component in translation;

pneumatic suspension means interposed between said polisher and said support for controlling the positioning of said polisher relative to the surface of the optical component; and means for mounting said polisher on said pneumatic suspension means so that said polisher may rotate about a point which substantially coincides with the point of application of the resultant of the friction forces between said polisher and the optical component.

11. Apparatus according to claim 10 further comprising means for controlling the pressure within said pneumatic suspension means so as to control and adjust the force with which said polisher is pressed against the optical component.

12. Apparatus according to claim 10 wherein said means for rotating said polisher about its axis of rotation comprises:

a longitudinal shaft connected to said polisher and suspended from said support;

a turntable mounted on said shaft which is free to slide and rotate on said shaft;

a beam that is substantially perpendicular to said axis of rotation and which is located between said polisher and said turntable; and first and second pairs of bending blades interconnecting said polisher and said turntable, said first pair of bending blades extending between said turntable and said beam and arranged in converging planes on opposite sides of said beam such that said planes of said first pair of bending beams intersect along an imaginary line on the opposite side of said polishing surface so as to define a first axis of said polisher, and said second pair of bending blades extending between said beam and said polisher and arranged in converging planes such that said planes of said second pair of bending blades intersect along an imaginary line on the opposite side of said polishing surface so as to define a second axis of said polisher;

said first and second axes intersecting each other so that said intersection defines said point.

13. Apparatus according to claim 12 wherein said means for rotating said polisher further comprises an electric motor carried by said support, a pulley connected to said turntable for transmission of rotary motion and mounted on said shaft for free rotation about said shaft, and belt means connecting said motor to said pulley to drive said pulley.

14. Apparatus according to claim 13 wherein said pneumatic suspension means comprises an annular deformable membrane located between said pulley and said turntable to interconnect said pulley and said turntable and which delimits a sealed chamber for retaining a gas under pressure, and means for connecting the sealed chamber to an external source of pressurized gas.

15. Apparatus according to claim 12 wherein said means for moving said polisher over the optical component in translation comprises:

a chassis;

a crank and connecting rod system supported by said chassis;

means for driving said crank and connecting rod system in rotary motion; and a movable frame suspended from said crank and connecting rod system and which carries said shaft supporting said polisher for moving said shaft and polisher in circular translation.

16. Apparatus according to claim 15 further comprising means for adjusting the eccentricity of said crank and connecting rod system so that the circular translation of said polisher may be varied.

17. Apparatus according to claim 10 wherein said support further comprises a robot arm having three degrees of freedom and having servo means mounted thereon for position control.

18. Apparatus according to claim 17 further comprising a lathe turntable for supporting an optical component for polishing and wherein said servo control means comprises means for controlling the motion of said polisher, the motion of said support, and the motion of said lathe turntable.

19. Apparatus according to claim 17 wherein said robot arm comprises:

a fixed stand; and first, second and third articulated elements, said first element being pivotally mounted on said fixed stand for rotation about a substantially horizontal axis, said second element being pivotally mounted to said first element for rotation about an axis that is substantially parallel to said axis of rotation of said first element, and said third element being pivotally mounted to said second element for rotation about a third axis parallel to said first and second axes, whereby said first, second and third articulated elements cooperate to support said polisher above an optical component for polishing.

20. Apparatus according to claim 19 wherein said first, second and third elements of said robot arm define sides of three separate deformable parallelogram mechanisms, said parallelogram mechanisms being interconnected and wherein two said parallelogram mechanisms are hinged about a common horizontal axis on said fixed stand.

* * * * *

UNITED STATES PATENT AND TRADEMARK OFFICE
CERTIFICATE OF CORRECTION

PATENT NO. : 5,138,798
DATED : August 18, 1992
INVENTOR(S) : Jean-Pierre Volat

It is certified that error appears in the above-indentified patent and that said Letters Patent is hereby corrected as shown below:

On the title page, under section [86] PCT No.:

"PCT/US89/00154" should be -- PCT/FR89/00154 --

On the title page, under section [56] References Cited:

"Alkinson" should be -- Atkinson --

"Ando" should be -- Ando et al. --

On the title page, under section [56] FOREIGN PATENT DOCUMENTS: "163052 10/1987 Japan" should be -- 163052 10/1982 Japan --

On the title page, under section [56] OTHER PUBLICATIONS: Programmed Optical Surfacing Equipment" should be -- Programed Optical Surfacing Equipment --

"Optical Society of American" should be
   -- Optical Society of America --

Column 4, lines 2 and 64, "excentricity" should be
  -- eccentricity --

Column 7, line 38, "excentricity" should be
  -- eccentricity --

UNITED STATES PATENT AND TRADEMARK OFFICE
CERTIFICATE OF CORRECTION

PATENT NO. : 5,138,798
DATED : August 18, 1992
INVENTOR(S) : Jean-Pierre Volat

It is certified that error appears in the above-indentified patent and that said Letters Patent is hereby corrected as shown below:

Column 8, line 37, "Excentricity" should be
-- Eccentricity --

Column 10, line 61, "or" should be -- of --

Column 11, line 31, "bending beams" should be
-- bending blades --

Signed and Sealed this

Twelfth Day of October, 1993

Attest:

BRUCE LEHMAN

Attesting Officer

Commissioner of Patents and Trademarks